United States Patent [19]

Berry et al.

[11] 4,429,372

[45] Jan. 31, 1984

[54] METHOD FOR INTEGRATING STRUCTURED DATA AND STRING DATA ON A TEXT PROCESSING SYSTEM

[75] Inventors: Richard E. Berry, Georgetown; John H. Wilson, Austin, both of Tex.

[73] Assignee: International Business Machines Corporation, Armonk, N.Y.

[21] Appl. No.: 273,569

[22] Filed: Jun. 16, 1981

[51] Int. Cl.³ .......................... G06F 3/153; G06F 3/12
[52] U.S. Cl. ..................................................... 364/900
[58] Field of Search ... 364/200 MS File, 900 MS File; 340/525, 712

[56] References Cited

U.S. PATENT DOCUMENTS

| | | | |
|---|---|---|---|
| 3,548,381 | 12/1970 | Dirks | 364/900 |
| 3,631,405 | 12/1971 | Hoff et al. | 364/200 |
| 3,670,310 | 6/1972 | Bharwani | 364/200 |
| 3,701,972 | 10/1972 | Berkeley et al. | 364/200 |
| 3,753,240 | 8/1973 | Merwin | 364/200 |
| 4,001,807 | 1/1977 | Dallimonti et al. | 340/525 |
| 4,051,459 | 9/1977 | Steranko et al. | 364/900 |
| 4,135,242 | 1/1979 | Ward et al. | 364/200 |
| 4,180,854 | 12/1979 | Walden et al. | 364/200 |
| 4,303,973 | 12/1981 | Williamson, Jr. | 340/712 |

*Primary Examiner*—Harvey E. Springborn
*Attorney, Agent, or Firm*—John W. Henderson, Jr.

[57] ABSTRACT

An improved method is disclosed for operating an interactive text processing system to integrate and process DP (data processing) type structured field data and WP (word or text processing) type text or string field data in the same record. The method involves displaying to the text processing system operator a menu of data type codes selectable through a keyboard for defining the types of data fields in a record. In response to operator selected field types, structured fields of fixed length and address pointers of fixed length for the string fields are established for the records. When the data is keyed in, the structured fields are concatenated with the address pointers for the string fields, and the text data, including format control codes, is stored at a system selected address on an auxiliary storage device such as a disk file. The structured field data is displayed or printed under control of the field length definitions and the string field data is displayed or printed under control of the address pointer and imbedded format control codes.

7 Claims, 6 Drawing Figures

| AREA/<br>ROOMS/<br>BATHS | SUBDIVISION/<br>SQ. FEET/<br>DESCRIPTION | ADDRESS/<br>REALTOR/<br>MORTGAGE | LOT#/<br>LOT SIZE/<br>TAX DISTRICT |
|---|---|---|---|
| 1A<br>9<br>2 | OAK HOLLOW<br>2800<br>TXT1 | 1310 ACORN DR.<br>WEAVER<br>57565.95 | 13<br>80 X 110<br>20C |
| THIS LOVELY THREE BEDROOM HOME FEATURES TWO FULL BATHS, TILED FOYER, WET BAR AND MICROWAVE OVEN. CLOSE TO OAKLEAF ELEMENTARY SCHOOL AND IN THE COMMUNITY PARK. ||||
| 1C<br>10<br>2 1/2 | OAK LAWN<br>3200<br>TXT1 | 4918 ASPEN CIR.<br>N.T.A. INC.<br>105315.19 | 27<br>130 X 185<br>15B |
| IMMACULATE FOUR BEDROOM, FORMAL DINING AND LIVING AREAS WITH THREE FIREPLACES AND ENERGY CONSERVATION PACKAGE, LOW EQUITY. ||||

| LAST NAME | FIRST NAME | ACCT. NO. | BALANCE |
|---|---|---|---|
| ASHFORD | JOHN | 192687 | 537.80 |
| BETTIS | ALBERT | 687291 | 25.18 |
| COLEMAN | STEWART | 298736 | 1024.20 |
| DAVIS | EDWARD | 396219 | 25.00 |

FIG. 6

METHOD FOR INTEGRATING STRUCTURED DATA AND STRING DATA ON A TEXT PROCESSING SYSTEM

DESCRIPTION

1. Field of the Invention

This invention relates generally to the formatting of data files in a text processing system for storage, display, printing or communication. More particularly, this invention relates to methods for automatically integrating data processing fixed length fields and word processing variable length fields into the same data records in a text processing system.

2. Description of the Prior Art

Prior art computer systems tended to support either "DP Data" or "WP Data". DP (data processing) data is typically characterized as having structured fields of fixed length, that is, each field is the same length in every record of a file regardless of how much data it actually contains. When the data does not entirely fill the field positions, the system adds "null" or "blank" characters until the field is full. DP data fields typically contain only graphic data characters (letters, numbers, symbols). The processing of DP data is usually concerned with the reorganization of data by value, the summarization of data by value, the generation of new data values or the collection of data values in long term data bases. WP (word or text processing) data is characterized by variable length field text or string data which contain both graphic data characters and format control characters, such as carrier returns, tabs, font change, etc. The processing of WP data is usually concerned with text formatting, such as character, word, line, paragraph or page orientation, type styles, pagination, margin text, and footnotes, with little or no regard for the data values.

Prior art computer systems for processing DP data were typically large and expensive hardware boxes, such as the IBM system/370, capable of being programmed by the user to provide a variety of functions with structured data. On the other hand, prior art WP systems, such as the IBM office system 6, tended to be relatively inexpensive and preprogrammed to provide function similar to those of an office typewriter. As technology has advanced, the cost of computing power per instruction has been reduced drastically in recent years. Stemming from the lower cost of computing power is an effort to support both DP data processing and WP data processing on the same computer system. The prior art systems which have attempted to integrate DP data and WP data on a single system have typically required that the data be maintained in separate files and have required a run through a conversion routine to process the data as either DP data or WP data. An example of a text processing program for use on a DP system is the IBM program product "Document Composition Facility" marketed in 1978 for the IBM System/370.

SUMMARY OF THE INVENTION

The present invention discloses a method for operating a processor driven text processing machine which is capable of integrating and processing structured field DP data and variable length field WP text data containing format codes in the same logical record. A control system displays to the operator a menu of predetermined data types to be selected by the operator in defining data fields in a record. The operator selects a field type for each field of the record in the order in which data will be entered for the records. Additionally, the system may request a field length specifying the maximum length for each structured field. The field type descriptions and lengths are stored and used by the control system to construct records which are added to the file when data is entered. For each WP data field type that is entered, the system constructs and substitutes a fixed-length pointer to storage locations wherein the text and format control codes for the WP data are stored. Upon recall of the records from storage for display or printing, the fixed length fields are displayed or printed in the order of entry including the pointer code for the text (WP data). The text data is displayed or printed under the control of the stored format control codes in the order of its entry following the fixed-length data for each record.

BRIEF DESCRIPTION OF THE DRAWING

FIG. 6 illustrates the display of the data as it would appear in the printer device or display device of FIG. 1, in accordance with the present invention.

DESCRIPTION OF THE PREFERRED EMBODIMENT

Figure 1:
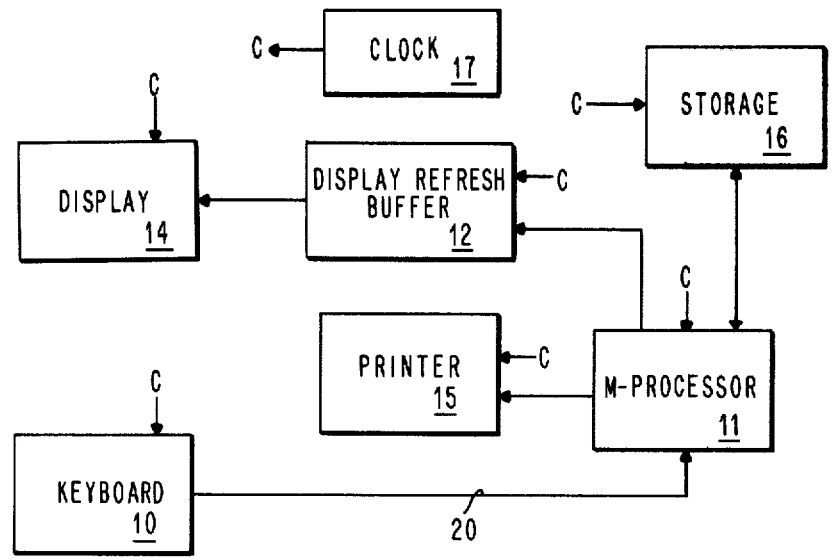
FIG. 1 is a block diagram of an interactive text processing system embodying the present invention.

The invention will now be described as embodied in an interactive text processing system of the type shown in FIG. 1. As shown in FIG. 1, the text processing system illustrated therein comprises a keyboard 10, a microprocessor 11, a display refresh buffer 12, a display device 14, a printer 15, and an auxiliary direct access storage device 16 such as a disk drive. A clock 17, for keeping the various components of the system in synchronism, is also shown in FIG. 1 and is effectively coupled to each of the units.

Keyboard 10 comprises a normal set of graphic symbol keys such as letters, numbers, punctuation marks, and special character keys, plus text format or control keys like carriage return, tab, index, etc. In addition, the keyboard 10 includes a second set of control keys for issuing special control commands to the system. The control keys include cursor movement keys, keys for setting the keyboard 10 into a number of different modes, etc.

Figure 2:
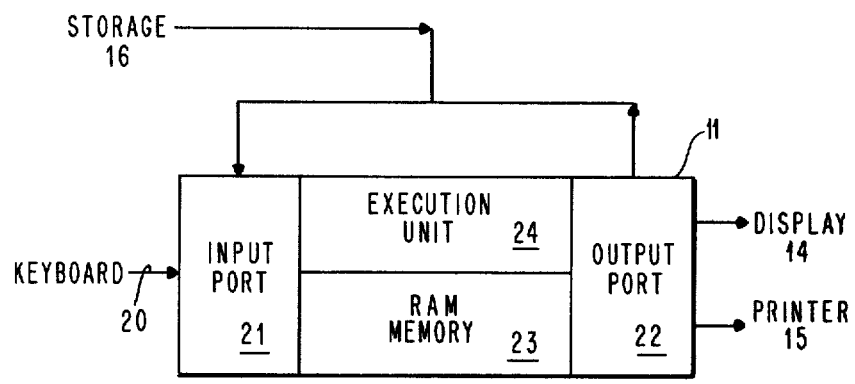
FIG. 2 is a functional diagram of the microprocessor shown in FIG. 1.

The keyboard 10 is connected to the microprocessor 11 by means of a bus 20. The microprocessor 11, as shown in FIG. 2, comprises an input port 21, an output port 22, a random access memory 23, and a process execution unit 24.

Figure 3:
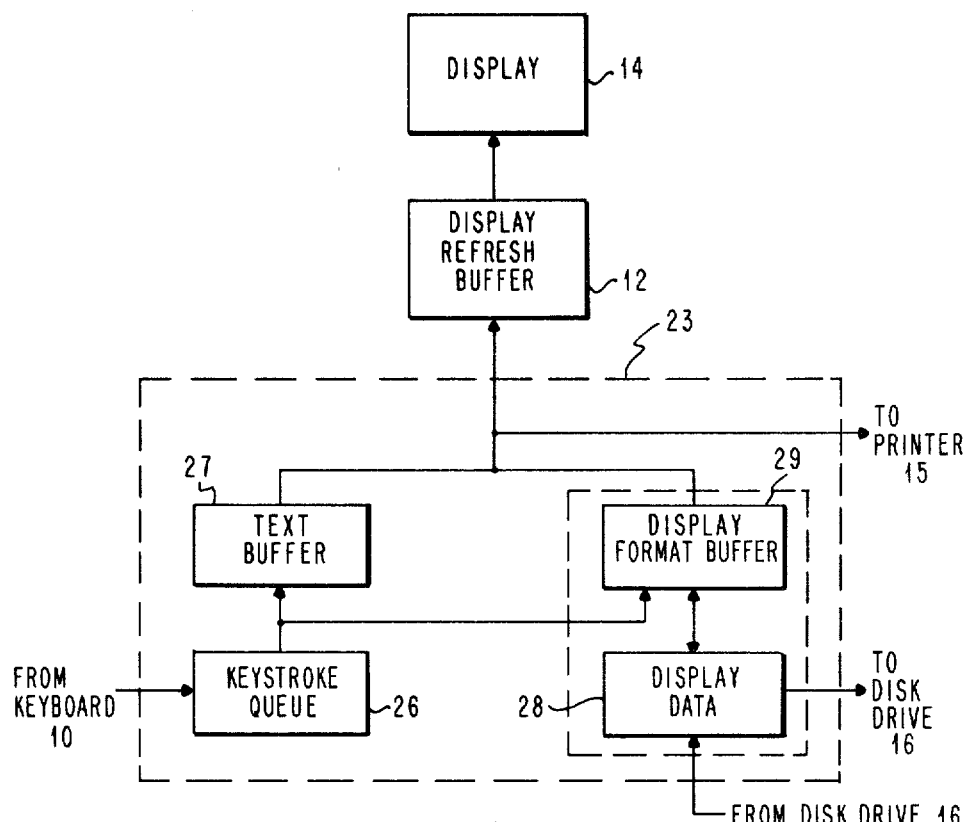
FIG. 3 is a functional diagram illustrating the data flow path between portions of the memory and the microprocessor and the display refresh buffer.

Functionally, memory unit 23 stores both instructions and data in specified sections which will be described in more detail later on in the specification. Data is entered into memory 23 from the keyboard 10 as bytes of binary information through input port 21. As shown in FIG. 3, the section of RAM 23 which receives the keystroke data from the keyboard 10 is designated keystroke queue 26. Data to be displayed is transferred by a series of instructions from queue 26 to the text buffer section 27 and then to the display refresh buffer 12 through output port 22 of the microprocessor 11. This is achieved in a conventional way by the microprocessor 11 executing a series of move instructions.

The microprocessor 11 may be an IBM Series 1, INTEL model 8086, or any of the recognized functionally equivalent, currently available microprocessors.

The display refresh buffer 12 is shown as a separate buffer connected between the output port 22 and the display device 14. Buffer 12, in practice, is normally a part of the display device 14 and functions to control the generation of characters on the screen of the display device 14 by exercising on-off control of the beam as it traces a series of horizontal lines across the screen.

The output port 22 also supplies data stored in memory 23 to the printer 15 and disk storage unit 16, each of which may have their own internal buffers which are not shown. Commands to transfer data from the random access memory 23 to the printer 15 or storage unit 16 are sent to the microprocessor 11 by the operator from the keyboard 10.

Printer 15 may be any suitable printer known in the art. In most text processing systems, the printer 15 is basically a standard input/output terminal printer having a type ball element or a daisy-wheel print element.

Disk storage 16 may also be any suitable disk storage device which is capable of storing serial by byte data supplied to it at determined sector address locations, each of which are randomly addressable by the microprocessor 11 to retrieve the data. Spatially related data supplied from disk drive 16 is stored in the display data area 28 of the memory 23 in encoded form. The other section of memory 23 shown in FIG. 3 is the display format buffer area 29 which is involved in the handling of spatially related data in decoded form in accordance with the method of the present invention.

Figure 4:
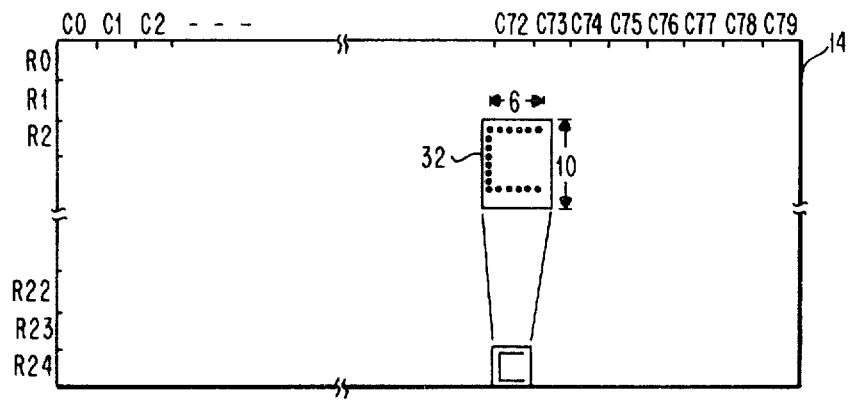
FIG. 4 is a diagrammatic view of the display shown in FIG. 1.

FIG. 4 is a schematic representation of the screen of display device 14. As shown in FIG. 4, the screen has, for example, the capability of displaying 25 lines of characters where each line consists of 80 character column positions. In practice, one character position consists of a matrix of dot positions or picture elements sometimes referred to as pels. A typical character matrix for a display of the type represented by device 14 would be a matrix of six wide by ten high pels, which has been designated by reference character 32 in FIG. 4. The interaction of the refresh buffer 12 and the display 14 is to convert the characters stored at a location in the buffer 12 to the corresponding character as formed in a 6×10 dot matrix at the equivalent location on the display 14. Display 14 generally is provided with its own set of electronics to achieve that conversion. The microprocessor 11 need only supply the address and load the buffer 12 with the appropriate characters.

The disk storage device 16 also is generally provided with its own set of electronics for converting a byte of data supplied from the display data area 28 of memory 23 through the output port 22 to a serial by bit stream of data to be recorded at a predetermined sector of the one addressed concentric recording track on the disk. Data from the device 16 is supplied to the microprocessor 11 serial by byte from the addressed sector and storage tracks when requested.

It will be understood that all of the above described functions and interactions involving the microprocessor 11 are achieved through suitable programs which are also stored in memory 23 and which are called into operation in response to data from the keyboard 10 or interrupt signals generated by the various components of the system shown in FIG. 1.

Figure 5:
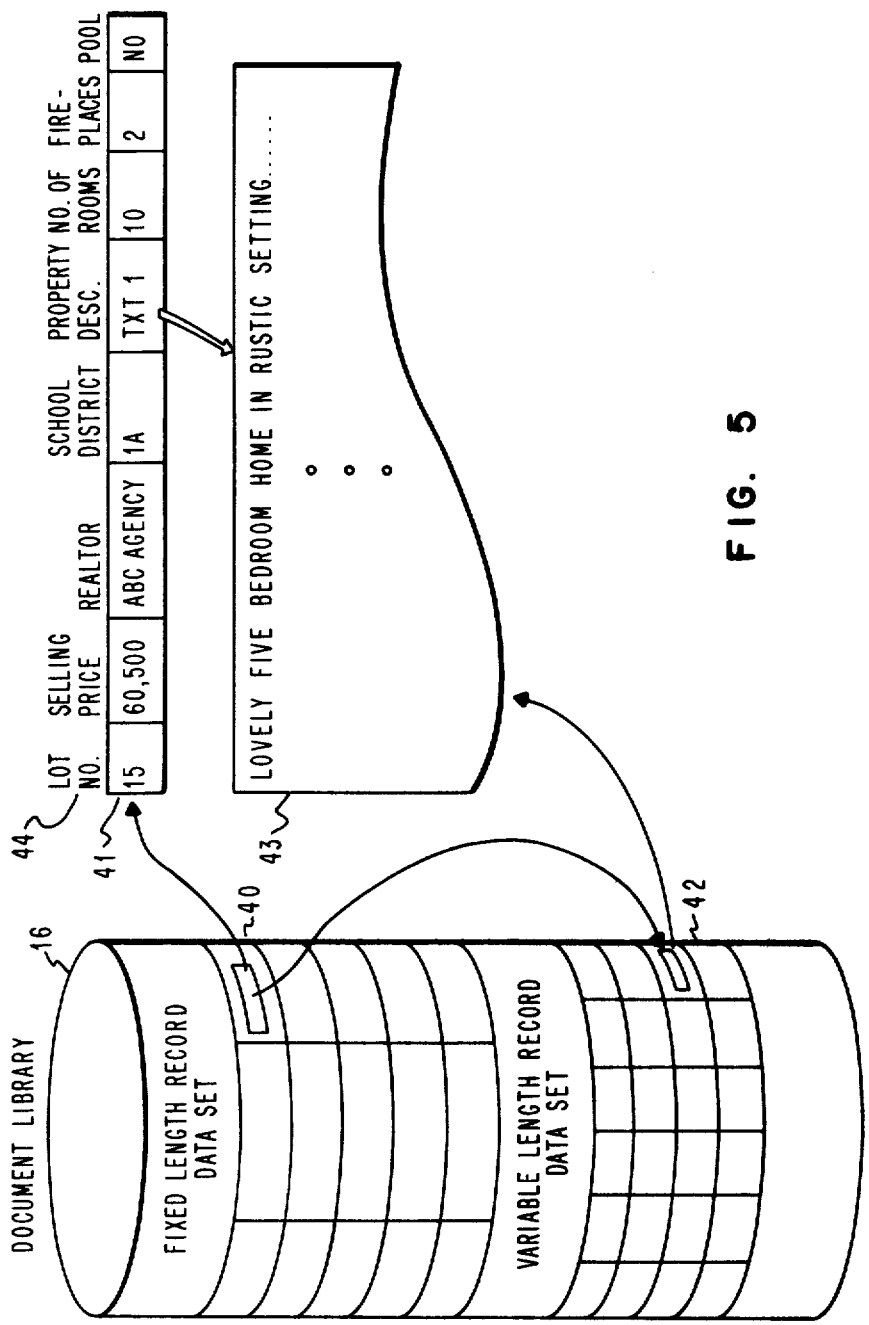
FIG. 5 illustrates the storage of data in the Storage device shown in FIG. 1.

FIG. 5 illustrates the storage arrangement for data stored on the disk storage device 16 of FIG. 1. During initial setup, the operator enters into the system using the keyboard 10, a field type and heading for each of the fields to be entered into a file. The headings are designated by reference number 44 in FIG. 5. A code is entered from the keyboard 10 designating each field as a fixed-length field or text field. For each fixed-length field, additional codes are entered specifying the field length and designating the field as either character or arithmetic. For each field that is designated as a text field type, the control system supplies a fixed-length code which reserves space for a "pointer" to be filled in when text data is entered. When data for the records is entered into the system, the control system controls the processor 11 to concatenate the fixed-length fields and store them at addresses on the disk file 16 designated for fixed-length records as shown by reference number 40. For example, in FIG. 5 the fixed length records are shown as having a maximum length of 1,000 bytes each. When a text field is encountered during data record entry, the system stores an address pointer with the fixed-length fields which points to an address in the variable length section 42 of the disk 16 selected for storing the variable length text fields. For example, the section 42 is divided into 256-byte segments. The data for the text field as keyed will be stored in one or more of these 256-byte segments in the variable length data storage area on the disk and includes the text information and format control codes such as carrier returns, tabs, and index codes. If the length of the text field exceeds 256 bytes, the control system will chain multiple 256-byte segments together to provide the necessary field length by inserting in each segment a pointer to the address of the next segment. An example of a text field is the property description 43 shown in FIG. 5.

FIG. 6 illustrates two examples of reports generated that would be displayed to the operator on the display 14 using the present invention. The report 50 contains records having only fixed-length fields or DP data. The headings 51 identify each field in the records. The records 52 are displayed with the fields horizontally spaced across the display below the headings.

Still referring to FIG. 6, the report 54 shows an example of records which include both fixed-length field DP data and variable length field WP data. The headings 55 for each of the data fields are arranged horizontally by rows and vertically by columns separated by slashes. The fixed length field data 56 is displayed below the headings with the first row of data corresponding to the first row of headings, the second row of data corresponding to the second row of headings, and the third row of data corresponding to the third row of headings. The text data corresponding to the description field is designated by the code TXT1 58 in the fixed length field data 56 and is displayed following the fixed length field data at 57. The text data 57 is processed as it is displayed under the control of embedded format codes which indicate margins, carrier returns, tabs and interlinear spacing.

The manner in which the control system operates the processor to display the report 54 will now be described briefly. The operator places the system in a data entry mode such as "Create Files" through the keyboard 10. In response, the processor 11 under program control, displays on display 14 a request that the operator enter a file name and field descriptions for the data records to be entered into the file. A typical operator response may be "Real Estate File". The operator then keys in Field Names, Headings, Types, and Lengths for each field. For example, Field 1, AREA/,Character, 2;
Field 2, SUBDIVISION/,Character, 15;
Field 3, ADDRESS/,Character, 15;
Field 4, LOT#/,Character, 4;

defines the first line of headings and the first line of data of the report 54. For the variable length field designated "DESCRIPTION", the operator enters Field 10, DESCRIPTION, TXT1. The processor interprets TXT1 as requiring storage in the variable length file area of the disk device 16 and reserves space in the fixed length record for an address to be determined as each record is entered.

Once the file description is created, the operator keys in the data records corresponding to the file description in the same order as the fields were set up. The microprocessor 11 concatenates each of the fixed length fields into a contiguous record, including the system determined address pointer to the text field, and stores the fixed length record in the area 40 and the variable length text in area 42 of the disk storage device 16.

The operator can instruct the microprocessor 11 to recall the data for display or listing by naming the "Real Estate file" in a "Display" or "Report Generation" job. The processor 11 will then access from the disk 16 the fixed length data records and headings and display the records on the display 14 through the display refresh buffer 12. The microprocessor 11 also uses the address provided by the TXT1 field to access from the disk 16 any variable length field data associated with the record. The variable length field data contains the necessary format control codes to tell the processor 11 how it is to be formatted on the display 14 or printer 15.

Suitable program routines for implementing the described control system are shown in the following tables:

TABLE 1

| DESCRIPTIVE NAME = PUT TEXT FIELD | |
|---|---|
| FUNCTION = | WRITES TO DISK THE TEXT CONTAINED IN THE BUFFER FOR THE SPECIFIED LENGTH<br>This function allocates disk space, copies the user data from the user buffer into the text blocks, and stores the length of the text and the DSRSN of the first text block in the array in the ODMA, according to which text field the user said to use. |
| LEGEND: | DSRSN = Data Set Relative Sector Number<br>ODMA = Operand Data Set Memory Area<br>IOCB = Input/Output Control Block |

BEGINPDL 010,005
ALFMPTX MAIN MODULE (PUT TEXT FIELD)
ALLOCATE IOCB
ALLOCATE 256 BYTE BUFFER TO HOLD USER DATA
SAVE ADDRESS OF TEMP BUFFER
DO
GET THE TEXT FIELD NUMBER THE USER SPECIFIED
IF USER WANTS FIRST TEXT FIELD THEN
GET FIRST TEXT FIELD OFFSET IN ODMA
IF TEXT NOT VALID FOR FILE (ODMA OFFSET NULL) THEN
SET RETURN CODE TO INVALID TEXT SPECIFICATION
EXITDO
ELSE

TABLE 1-continued

| DESCRIPTIVE NAME = PUT TEXT FIELD |
|---|

RELEASE ANY EXISTING BLOCKS IN TXT STACK
IF USER SPECIFIED LENGTH OF ZERO THEN
SET LENGTH IN FIRST ARRAY ELEMENT TO ZERO TO ERASE TEXT FIELD
EXITDO
ELSE
INITIALIZE LENGTH FIELD IN FIRST ARRAY ELEMENT TO NULL
ENDIF
ENDIF
ELSE
IF USER WANTS SECOND TEXT FIELD THEN
GET SECOND TEXT FIELD IN ODMA
IF TEXT NOT VALID FOR FILE (ODMA OFFSET NULL) THEN
SET RETURN CODE TO INVALID TEXT SPECIFICATION
EXITDO
ELSE
RELEASE ANY BLOCKS IN TXT STACK
IF USER SPECIFIED LENGTH OF ZERO THEN
SET LENGTH IN 2ND ARRAY ELEMENT TO ZERO TO ERASE TEXT FIELD
EXITDO
ELSE
INITIALIZE LEN OF SECOND ARRAY ELEMENT TO NULL
ENDIF
ENDIF
ELSE (USER DID NOT SPECIFY VALID TEXT FIELD NUMBER)
SET RETURN CODE TO INVALID TEXT SPECIFICATION
EXITDO
ENDIF
ENDIF
ALLOCATE ONE 256 BYTE BLOCK ON DISK
IF BLOCK WAS ALLOCATED THEN
SAVE DISK ADDRESS OF NEW BLOCK IN IOCB
IF TEXT LENGTH IS >250 THEN
ALLOCATE A SECOND BLOCK ON DISK
IF IT WAS ALLOCATED THEN
SAVE DISK ADDR OF NEW BLOCK IN IOCB
MOVE FIRST 250 BYTES USER DATA INTO TEMPORARY BUFFER
STORE ADDR OF TEMP BUFFER FOR WRITE
APPEND DSRSN OF 2ND DISK BLOCK TO END
WRITE TEXT BLOCK TO DISK
IF WRITE WORKED THEN
MOVE 251ST BYTE TO END OF USER DATA INTO TEMPORARY BUFFER
WRITE 2ND BLOCK TO DISK
ELSE (WRITE FAILED)
RC SET TO IO TEXT ERR BY WRITE
ENDIF
ELSE (ALLOCATE FAILED)
SET RETURN CODE TO NO DISK SPACE
ENDIF
ELSE (LENGTH <250)
STORE ADDR OF USERS BUFFER FOR WRITE
WRITE TEXT BLOCK FROM USER BUF
ENDIF
ELSE (ALLOCATE FAILED)
SET RC TO NO DISK SPACE
ENDIF
IF EVERYTHING HAS WORKED THEN
IF PROCESSING FIRST TEXT FIELD THEN
STORE TOTAL LENGTH AND DSRSN OF FIRST TEXTBLOCK IN FIRST ELEMENT OF ARRAY
ELSE
STORE TOTAL LENGTH AND DSRSN OF FIRST TEXT BLOCK IN SECOND ELEMENT OF ARRAY
ENDIF
ENDIF
EXITDO
ENDDO
FREE TEMPORARY DATA BUFFER
RELEASE FDIO IOCB
RETURN TO CALLER

TABLE 1-continued
DESCRIPTIVE NAME = PUT TEXT FIELD

```
END MODULE ALFMPTX
ENDPDL
```

TABLE 2
DESCRIPTIVE NAME = GET TEXT FIELD

```
FUNCTION = This function gets the specified text field
           from disk and reads it into the user buffer.
BEGINPDL 010,005
ALFMGTX MAIN MODULE (GET TEXT FIELD)
ALLOCATE IOCB
DO
NOTE - TEXT PTR IN RECORD IS 6 BYTES - 2
BYTES LENGTH OF ENTIRE TEXT FOLLOWED BY
DSRSN OF FIRST TEXT BLOCK
IF RECORD CURSOR HAS BEEN MOVED THEN
REPOSITION CURSOR
IF RETURN CODE IS "END OF FILE" OR "REC NOT
FOUND" THEN
SET CURSOR STATE TO NOT SET
SET RETURN CODE TO "MOVED CURSOR"
EXITDO
ELSE
IF RETURN CODE INDICATES IO ERROR THEN
SET CURSOR STATE TO NOT SET
EXITDO
ELSE (RC=REC FOUND)
SET "MOVED CURSOR" BIT OFF BY SETTING
CURSOR STATE TO "ON RECORD"
ENDIF
ENDIF
ENDIF
IF CURSOR STATE IS NOT SET TO "ON RECORD"
THEN
SET RETURN CODE TO "NOT ON RECORD"
EXITDO
ENDIF
GET THE ADDRESS OF THE RECORD
GET THE TEXT FIELD VALUE THE USER PASSED
IF USER WANTS FIRST TEXT FIELD THEN
GET THE OFFSET OF THE FIRST TEXT FIELD IN
ODMA
IF TEXT FIELD INVALID FOR FILE THEN
SET RETURN CODE TO INVALID TEXT
SPECIFICATION
EXITDO
ELSE (TEXT ALLOWED)
GET PTR IN RECORD TO TEXT BLOCK
IF NO TEXT DATA EXISTS FOR THIS RECORD
THEN
SET RETURN CODE TO NO TEXT DATA
EXITDO
ENDIF
ENDIF
ELSE
IF USER WANTS SECOND TEXT FIELD THEN
GET OFFSET OF SECOND TEXT FIELD FROM
ODMA
IF TEXT NOT ALLOWED HERE FOR FILE THEN
SET RETURN CODE TO INVALID TEXT
SPECIFICATION
EXITDO
ELSE (TEXT ALLOWED)
GET PTR IN RECORD TO TEXT BLOCK
IF NO TEXT DATA EXISTS FOR THIS
RECORD THEN
SET RETURN CODE TO NO TEXT DATA
EXITDO
ENDIF
ENDIF
ELSE (USER DID NOT SPECIFY VALID TEXT FIELD
NUMBER)
SET RETURN CODE TO INVALID TEXT
SPECIFICATION
EXITDO
ENDIF
ENDIF
GET LENGTH OF ENTIRE TEXT
STORE ADDRESS OF USERS BUFFER FOR READ
```

TABLE 2-continued
DESCRIPTIVE NAME = GET TEXT FIELD

```
READ IN FIRST 256 BYTES OF THE TEXT FROM DISK
TO USERS BUFFER
IF READ WORKED OK THEN
IF LENGTH OF TEXT IS GREATER THAN 250 BYTES
THEN
GET POINTER TO SECOND TEXT BLOCK (LAST
4 BYTES OF FIRST TEXT BLOCK IS POINTER
TO SECOND)
STORE ADDR OF USERS BUFFER +256
READ IN SECOND TEXT BLOCK
IF READ WORKED OK THEN
MOVE SECOND SET OF USER DATA
FLUSH AGAINST FIRST BLOCK OF USER
DATA
ELSE (SECOND READ FAILED)
SET RETURN CODE TO IO ERR ON TEXT BLK
ENDIF
ELSE (ONLY ONE BLOCK TO READ)
ENDIF
ELSE (FIRST READ FAILED)
SET RETURN CODE TO IO ERROR ON TEXT BLOCK
ENDIF
EXITDO
ENDDO
RELEASE IOCB
RETURN TO CALLER
END MODULE ALFMGTX
ENDPDL
```

The sample program routines are written in Program Design Language (PDL). Table 1 is a routine controlling the processor 11 to segment text field data received from the keyboard 10 and store the text data on disk 16. This text data is concurrently formatted and displayed on the display 14 in a conventional manner through the text buffer 27, display format buffer 29 and display refresh buffer 12. Table 2 is a routine for controlling the processor 11 to retrieve previously stored text data from the disk 16 and concatenate multiple segments of the text field data into the buffer memory 23. The data is then available for display or printing.

While the invention has been particularly shown and described with reference to a preferred embodiment thereof, it will be understood by those skilled in the art that various changes in the form and details may be made therein without departing from the spirit and scope of the invention.

What is claimed is:

1. In an interactive text processing system including a processor, keyboard, display, printer, main memory and auxiliary storage device, an improved method for integrating and processing structured data and text data in the same record comprising the steps of:

(a) displaying from said main memory a menu of predetermined data type codes including structured data field type codes and text data field type codes, selectable by an operator through said keyboard for defining the data fields in a record;

(b) establishing in said main memory a structured data field of fixed length in said record for each structured data field type code selected by said operator through said keyboard;

(c) establishing in main memory an auxiliary storage device address pointer code for each text data field type code selected by said operator through said keyboard;

(d) concatenating said structured data field type codes and said text data field type codes in said main memory in the order selected to form a data record format;

(e) processing input structured data under control of said structured data field type codes to form structured data fields for said data records;

(f) processing input text data under control of said text data field type codes by generating auxiliary storage device addresses for said text data and storing said text data including embedded format control codes at the generated addresses; and (g) concatenating said structured data fields and said auxiliary storage device addresses into data records and storing said data records in said auxiliary storage device.

2. The method recited in claim 1 in which step (b) includes establishing a descriptive heading for each data field.

3. The method recited in claim 1 or claim 2 wherein step (c) further includes establishing a heading code for each text field.

4. The method of claim 1 wherein step (e) further includes concurrently displaying said structured data on said display in data record format.

5. The method of claim 3 wherein step (f) further includes displaying on said display said heading code in record format with said structured field data and displaying said text data in a format determined by format control codes imbedded in said text data.

6. The method of claim 1 wherein step (f) further includes generating a plurality of auxiliary storage device addresses and storing segments of said text data at each generated address.

7. The method of claim 1 further including the step of (h) recalling said records stored in said auxiliary storage device into main memory for printing thereof on said printer wherein said structured field data is printed in accordance with the structured field fixed lengths and said text data is printed in accordance with format control codes embedded therein.

* * * * *